United States Patent [19]

Sugimoto et al.

[11] Patent Number: 4,742,288
[45] Date of Patent: May 3, 1988

[54] CONTROL SYSTEM FOR AC MOTOR/GENERATOR OF SECONDARY AC EXCITATION TYPE

[75] Inventors: Osamu Sugimoto, Suita; Tadaatsu Kato, Takarazuka; Hidenori Sawa, Hitachi; Akio Ito, Hitachi; Hiroshi Sugisaka, Hitachi; Haruo Nohara, Hitachi; Masuo Goto, Hitachi, all of Japan

[73] Assignees: Hitachi, Ltd.; The Kansai Elect. Power, both of Tokyo, Japan

[21] Appl. No.: 915,392

[22] Filed: Oct. 6, 1986

[30] Foreign Application Priority Data

Oct. 8, 1985 [JP] Japan .............................. 60-222812
Feb. 5, 1986 [JP] Japan .............................. 61-23162

[51] Int. Cl.$^4$ ............................................. H02P 1/26
[52] U.S. Cl. ................................. 318/818; 318/819; 318/820; 318/821; 318/822; 323/212
[58] Field of Search ............... 318/818, 819, 821, 820, 318/822; 323/212, 215, 218

[56] References Cited

U.S. PATENT DOCUMENTS 4,590,416 5/1986 Porche et al. ...................... 323/212

Primary Examiner—William M. Shoop, Jr.
Assistant Examiner—Brian Young
Attorney, Agent, or Firm—Antonelli, Terry & Wands

[57] ABSTRACT

A control system for controlling the load of an AC motor/generator of secondary AC excitation type connected to a power system in parallel to at least a synchronous machine. The AC motor/generator has the secondary excitation winding thereof controlled in the amount of excitation so as to generate an output in accordance with an external output command. In the case of variation of power flow between the power system and the synchronous machine, the output command is corrected in accordance with the variation, and the amount of the secondary excitation is controlled by the corrected output command, whereby the variation of power flow between the power system and the synchronous machine is absorbed by the AC motor/generator thereby to prevent the synchronous machine from stepping out.

4 Claims, 9 Drawing Sheets

CONTROL SYSTEM FOR AC MOTOR/GENERATOR OF SECONDARY AC EXCITATION TYPE

BACKGROUND OF THE INVENTION

The present invention relates to a control system for an AC motor/generator of secondary AC excitation type, or more in particular, to a control system for an AC motor/generator of the type adapted to control the output of the AC motor/generator, which is connected to an AC power system, in accordance with load variation of the power system.

The conventional AC power plant such as a pumped-storage power plant has problems that it is impossible to regulate the load during its operation in the pumping-up mode and the system efficiency changes depending on the amount of power generation or the head of water storage demanded by the system at operation in the power-generation mode or the pumping-up mode, respectively. In order to solve those problems, an attempt has been made to use an AC motor/generator or an induction motor/generator of secondary AC excitation type capable of variable speed operation, in place of the conventional synchronous machine.

On the other hand, in a typical AC power system, a plurality of synchronous machines are used in parallel, and each synchronous machine is operated as a motor or a generator in accordance with the load conditions of the system in order to stabilize the system. In case of occurrence of sharp variation of the load by an accident or the like, the synchronous machine is directly affected by the load variation and may result in step out. Various measures have been taken to prevent this step-out in the prior art. As described before, the induction motor/generator of secondary AC excitation type, which may be used in place of the synchronous machine in the pumped-storage power plant, is free from stepping-out due to its structural characteristic. If it is possible to prevent the synchronous machine from stepping out by absorbing the load variation of the power system by the induction motor/generator, the induction motor/generator provided with the pumped-storage power generation plant may be used conveniently for that purpose.

SUMMARY OF THE INVENTION

The present invention is made by taking account of the fact that an AC motor/generator of secondary AC excitation type is free from stepping out due to its structural characteristics, and has an object to provide a control system of an AC motor/generator of the type in which the output of the AC motor/generator is controlled in accordance with variation of load of a power system to which the AC motor/generator is connected so as to absorb the load variation of the power system by the AC motor/generator thereby preventing any synchronous machine connected to the power system from stepping out and improving the stability of the power system.

In order to achieve the above-mentioned object, there is provided according to the present invention, a control system for an AC motor/generator of secondary AC excitation type, comprising means for correcting a load command, which is externally supplied for controlling the output of the motor/generator, on the basis of variation in power flow at a selected point of the power system connected to the AC motor/generator, means for determining the amount of secondary excitation of the AC motor/generator on the basis of the corrected load command, and means for applying the amount of secondary excitation thus determined to the secondary winding of the AC motor/generator.

DESCRIPTION OF THE PREFERRED EMBODIMENTS

Figure 1:
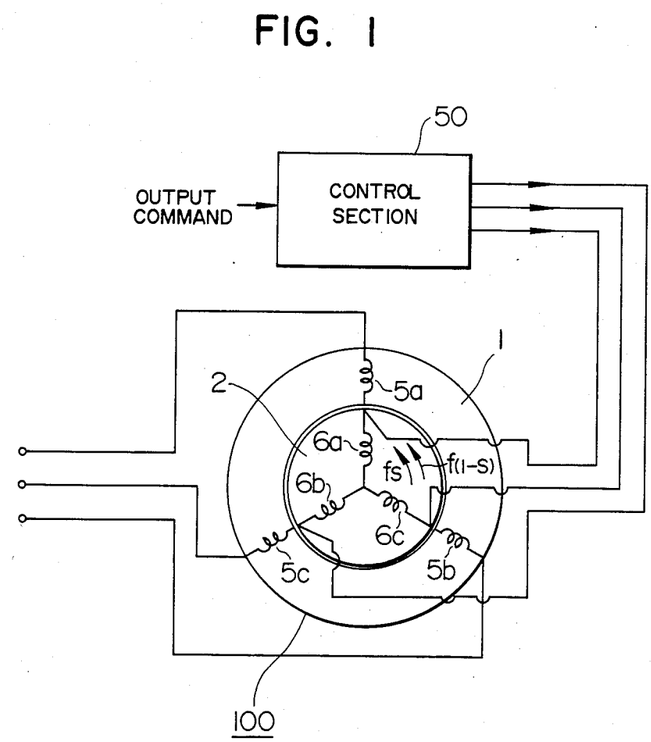
FIG. 1 is a diagram showing a basic circuit for control of an AC motor/generator of secondary AC excitation type.

The AC motor/generator of secondary AC excitation type has such a characteristic that its speed, when operated as a motor, and its output frequency, when operated as a generator, can be easily controlled by controlling the secondary excitation thereof. The AC motor/generator of secondary excitation type typically includes an induction machine of secondary excitation type, and therefore will hereinafter be referred to as "the variable-speed induction machine". A basic circuit for control of the variable speed induction machine is shown in FIG. 1. An induction machine 100 includes a stator 1 having three-phase primary windings 5a, 5b, 5c and a rotor 2 having three-phase secondary windings 6a, 6b, 6c.

Assume that f is the rated frequency, S is the slip and k is a constant determined by the construction of the induction machine. The speed of the rotor 2 is given as kf(1−S). When the secondary winding of the rotor is excited with the frequency of slip S, therefore, the rotating magnetic field produced in the rotor 2 rotates at a rotating speed of slip zero (synchronous speed), which is equal to the rotating speed of the rotating magnetic field of the stator 1.

The excitation control of the secondary windings 6a, 6b, 6c is effected by a control section 50. The control section 50 generates excitation voltages $v_1$, $v_2$, $v_3$ according to the command value and applies them to the secondary windings 6a, 6b, 6c.

$$v_1 = E\sin(2\pi f \cdot S + \delta_0 + \Delta\delta)$$
$$v_2 = E\sin(2\pi f \cdot S + \delta_0 + \Delta\delta - 120°) \quad (1)$$
$$v_3 = E\sin(2\pi f \cdot S + \delta_0 + \Delta\delta - 240°)$$

where E is a voltage value determined by the slip S and the operating conditions of the variable-speed induction machine, $\delta_O$ the basic phase angle determined by the operating conditions of the variable-speed induction machine, and $\Delta\delta$ the controlled phase angle determined according to the load command to the induction machine.

By applying the secondary excitation as abovementioned, the armature winding (windings 6a, 6b, 6c of the rotor 2) necessarily generates an output voltage of the system frequency at any rotational speed of the machine. Specifically, in the example of FIG. 1, the rotating field of the rotor 2 is given as $$f(1-S)+fS=f \quad (2)$$

indicating that the frequency of the rotating magnetic field as produced is always the rated frequency f independently of the slip S.

Explanation will be made of the control of the secondary excitation for operating the variable-speed induction machine so as to absorb the load variation in the power system by utilizing the above-mentioned characteristics of the variable-speed induction machine. The variable-speed induction machine is explained as, but not limited to, a water-wheel driven generator in a pumped-storage power plant connected to the same power system.

Figure 2:
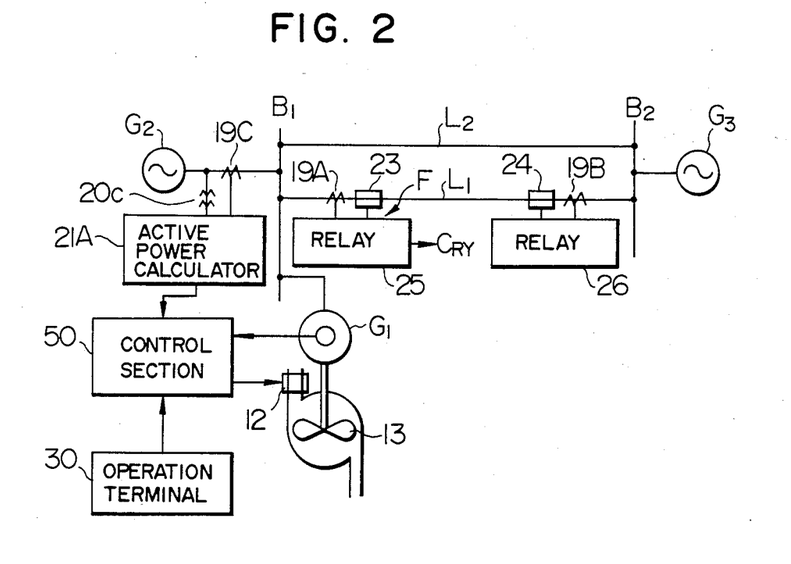
FIG. 2 is a schematic diagram showing a power system to which the present invention is applied.

FIG. 2 is a connection diagram of the system applied to a power transmission system including two systems (buses) $B_1$, $B_2$ connected to each other by transmission lines $L_1$ and $L_2$. The system $B_1$ has a synchronous machine $G_2$ and a variable-speed induction machine $G_1$ connected in proximity to each other, while the system $B_2$ has a synchronous machine $G_3$ coupled thereto. In the transmission line $L_1$, there are provided a current transformer 19A and a circuit breaker 23 on the system $B_1$ side, and a current transformer 19B and a circuit breaker 24 on the system $B_2$ side. Further, provided are protective relays 25 and 26.

The variable-speed induction machine $G_1$ corresponds to the induction machine 100 shown in FIG. 1. An active power processor 21A computes the active power for the synchronous machine $G_2$ from the current and voltage values of the synchronous machine $G_2$ detected by the transformers 19C and 20C. A control section 50 corresponds to the control section 50 in FIG. 1 and corrects the output command value based on the output of the active power processor 21A. The static head H of the water power of the pumped-storage power plant and the output command value (active power command value) $P_O$ are applied from an operating terminal 30 to the control section 50.

The synchronous machines $G_2$ and $G_3$ operate so as to eliminate the unbalance between the systems, and each operates as a motor or a generator so as to absorb or generate electrical energy.

In this configuration, assume that a grounding fault has occurred at a point F. In the conventional systems, upon occurrence of a grounding fault at the point F, the protective relays 25, 26 are activated through the current transformers 19A, 19B thereby to open the circuit breakers 23, 24. As a result, an extreme unbalance is caused between the input and output of the synchronous machines $G_2$ and $G_3$, so that the synchronous machine $G_2$ undergoes an acceleration stepout when power is supplied from $G_2$ to $G_3$ (that is, $G_2$ operates as a generator), or a deceleration step-out when power is supplied from $G_3$ to $G_2$ (that is, $G_2$ operates as a motor).

According to this embodiment, in order to prevent this step-out, the normal active output of the synchronous machine $G_2$ is monitored at the processor 21A from the detection values of the current transformer 19C and the voltage transformer 20C disposed on the synchronous machine $G_2$ side, and the variable-speed induction machine $G_1$ adjacent to the synchronous machine $G_2$ is controlled in such a way that the output of the synchronous machine is not different between after and before the fault. As a consequence, the step-out of the synchronous machine $G_2$ is prevented and the system is stabilized. In the process, the control of the variable-speed induction machine $G_1$ is effected by the control section 50. Although the above explanation is made in case of the synchronous machines $G_2$ and $G_3$ being provided for stabilizing the system, the present embodiment may be also applied to the case where the synchronous machines $G_2$ and $G_3$ are provided to operate as normal generators. A synchronous machine normally operating as a generator can be operated as a motor for absorbing energy.

Now, explanation will be made of the operation of the control section 50.

Figure 3:
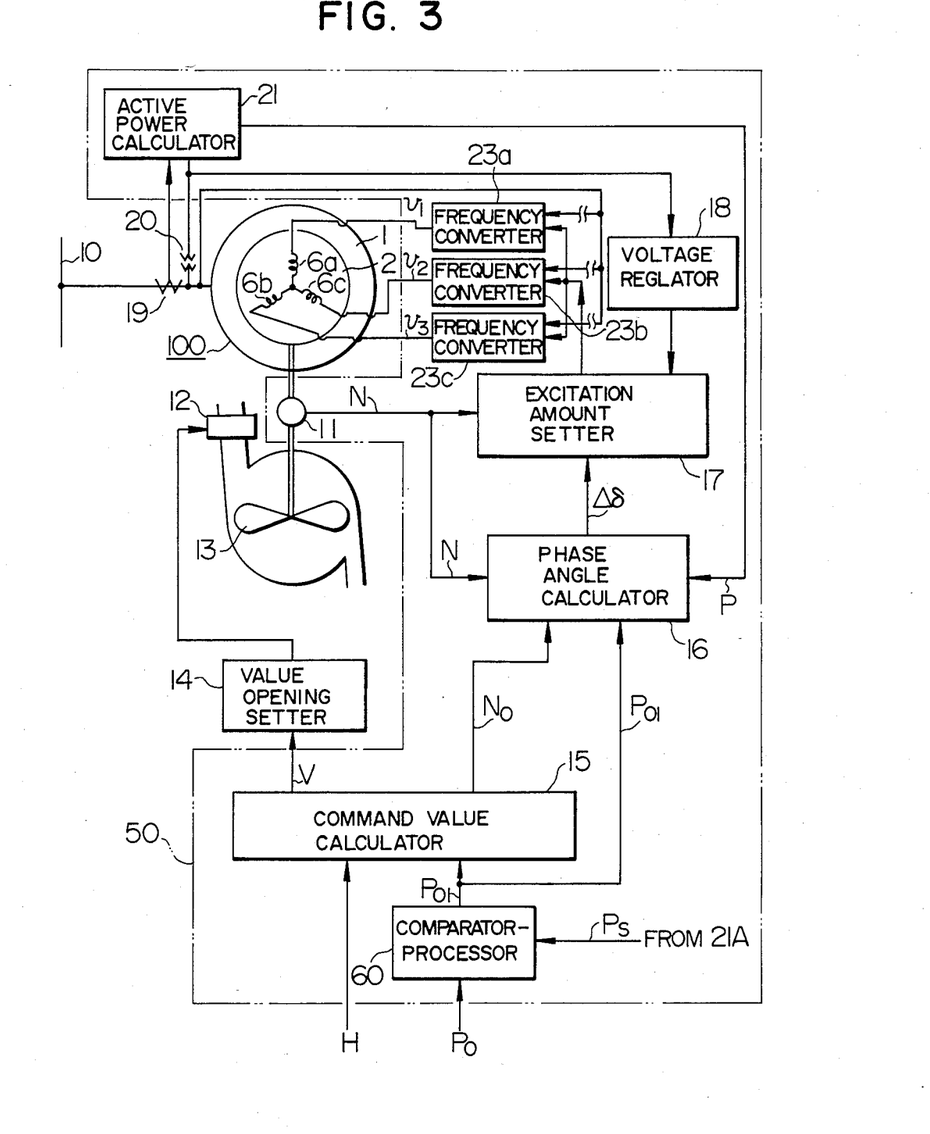
FIG. 3 is a block diagram showing a control system according to an embodiment of the present invention.

FIG. 3 is a diagram showing a generator control system for a pumped-storage power plant. An induction machine 100 has a function as a generator, the output of which is supplied to a system 10. The rotating shaft of the rotor 2 of the induction machine 100 is coupled to a water turbine 13 and is rotated by the water turbine 13.

A guide valve 12 of the water turbine 13 is controlled by a valve-opening setter 14, while the excitation of the secondary windings 6a, 6b, 6c of the induction machine 100 is controlled by frequency converters, such as cyclo-converters, 23a, 23b, 23c.

The control section 50 controls the secondary excitation of the induction machine $G_1$ and the opening of the governor valve 12 of the water turbine so as to cause the system to operate at a high-efficiency. When a command is given for the induction machine $G_1$ to reduce its power generation output, for instance, the speed and the valve opening are calculated in a well-known manner, and the operation is controlled according to the result of the calculation thereby to reduce the power generation output as commanded. The deviation in the rotational speed of the induction machine $G_1$ from its rated speed, on the other hand, is corrected by controlling the slip frequency of the excitation thereby to produce the rated frequency.

Specifically, the control section 50 is supplied with the static head H and the output command value $P_0$ from the operating terminal 30 in FIG. 2. In normal operation, the comparator-processor 60 produces an output of $P_{01}$ which is the same as its input command $P_0$ ($P_{01}=P_0$) The command value processor 15 is supplied with the static head H and the output command value $P_{01}=P_0$, and calculates the opening command value V for the governor valve and the speed command value $N_0$ in a well-known manner. The valve opening setter 14 controls the opening of the valve 12 in accordance with the opening command value V. The command value processor 15 per se may be any of the conventional types and the detailed explanation thereof will be omitted.

Figure 4:
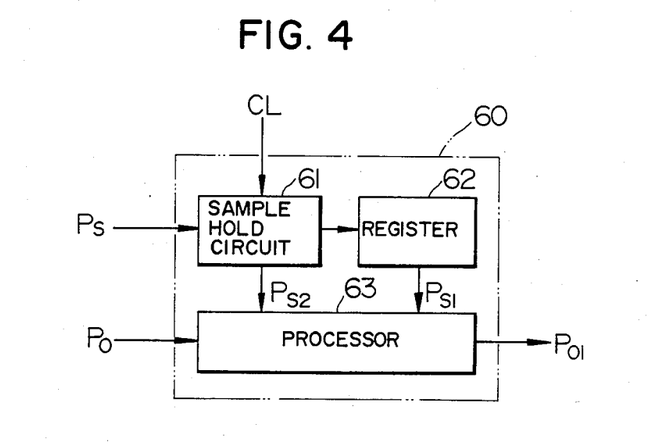
FIG. 4 is a diagram showing a configuration of a comparator-processor included in FIG. 3.
Figure 5:
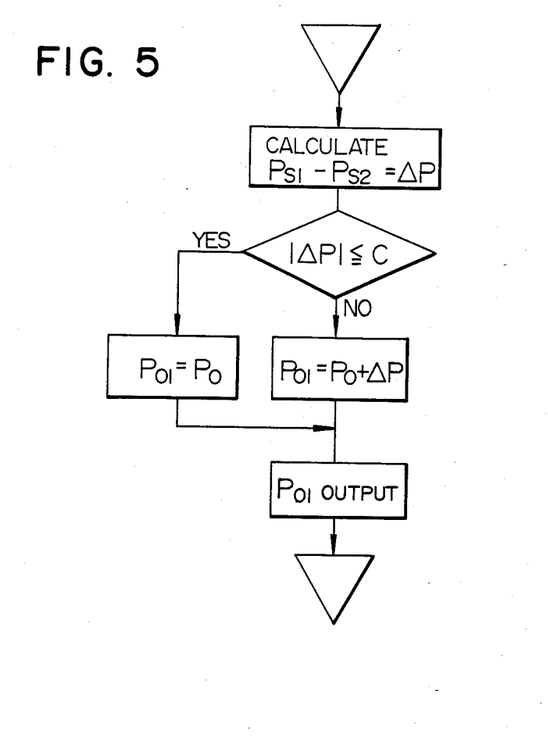
FIG. 5 is a flowchart representing the processing by the system shown in FIG. 4.

The comparator-processor 60 is configured as shown in FIG. 4. A sample-hold circuit 61 is supplied with an output of the active power processor 21A, that is, a signal $F_S$ representing the active output of the induction machine $G_2$, and samples the instantaneous value of $P_S$ in synchronism with each pulse of a predetermined clock signal CL and holds it until it receives the next pulse. Upon generation of the next pulse, the value of $P_S$ thus held is stored in a register 62, and a new value of $P_S$ is sample-held. As a result, the new value $P_{S2}$ of $P_S$ obtained at each sampling time point is held in the sample-hold circuit 61, while the old value $P_{S1}$ of $P_S$ obtained at the preceding sampling time point is held in the register 62. The processor 63 executes the processing in accordance with the flowchart of FIG. 5. Specifically, the variation $\Delta P = P_{S1} - P_{S2}$ of $P_S$ is calculated, whether the absolute value $|\Delta P|$ of $\Delta P$ is smaller than or equal to a predetermined value C is checked, and if $|\Delta P| \leq C$, the value $P_0$ is produced as a corrected output command value $P_{01}$ directly. If $|\Delta P| > C$, by contrast, $P_{01} = P_0 + \Delta P$ is determined and produced as a corrected output command value.

The phase angle calculator 16 is supplied with the detected active power P of the active power calculator 21, the corrected output command value $P_{01}$, the speed command value $N_0$ and the detected speed N for calculating the phase angle $\Delta\delta$ of the secondary winding based on the values $N_0$ and $P_{01}$ according to the equation (3) shown below. The detected active power P is calculated by the active power detector 21 on the basis of the detected current and the detected voltage derived from the current transformer 19 and the voltage transformer 20 respectively. The speed N is detected by the speed detector 11.

$$\Delta\delta = \int k_1(P - P_{01})dt + \int k_2(N - N_0)dt - K_1(P - P_{01})dt + K_0(N - N_0) \quad (3)$$

where $K_1$, $K_2$, $k_1$ and $k_2$ are constants.

The secondary excitation for the secondary windings 6a, 6b and 6c is supplied from the primary side of the induction machine 100 through the cyclo-converters 23a, 23b and 23c, respectively, each of which produces an AC voltage of controlled amplitude, frequency and phase. The cyclo-converters 23a, 23b and 23c are controlled by an excitation amount setter 17 such that the outputs thereof have respective frequencies and phases determined by the detected speed N and the calculated phase angle $\Delta\delta$, thereby causing the cyclo-converters to produce output voltages, respectively, as given by the equations (1). The voltage regulator 18 controls the level of the output voltages of the cyclo-converters through the excitation amount setter 17 so as to make the voltage detected by the voltage transformer 20 coincidence with a rated voltage of the power system. The control of the cyclo-converters by the excitation amount setter is well known and hence the detailed explanation of the circuit arrangement thereof will be unnecessary.

The operation of the embodiment when used with the system of FIG. 2 will be explained. Assume that a fault occurs at the point F of the transmission line $L_1$ as shown in FIG. 2 when the synchronous machine $G_2$ is supplying an active power to $G_3$. The protective relays 25, 26 detect the fault through the current transformers 19A, 19B, and issuing an interruption command to the circuit breakers 23, 24, separate the power transmission line $L_1$ from the system. If the output before the fault is $P_{S1}$, the synchronous machine $G_2$ is driven by a turbine input $P_m$ which substantially corresponds to the output $P_{S1}$ before the fault. When the fault occurs, the output of the synchronous machine as a generator is reduced almost to zero, and therefore without any control, the input $P_m$ is used for accelerating the synchronous machine operating as a generator.

According to this embodiment, the active power of the synchronous machine $G_2$ is monitored, and it is decided whether the change in active power of the synchronous machine $G_2$ is within a predetermined allowable range. If there is any change beyond the allowable range, the difference $P = (P_{S1} - P_{S2})$ between the output $P_{S1}$ before fault and the output $P_{S2}$ after fault of the synchronous machine $G_2$ is calculated and this difference $\Delta P$ is used to correct the command value $P_0$. Let $P_{01}$ be a command value after correction, and the value of $P_{01}$ is given by an equation (4) below.

$$P_{01} = P_0 + \Delta P \quad (4)$$

On the basis of this new command value $P_{01}$, the calculation of equation (3) is effected at the calculator 16 thereby to obtain a corrected value of $\Delta\delta$. This corrected value $\Delta\delta$ is used for determining the phase of the secondary excitation required for the induction machine to absorb the power variation which occurred in the system due to the fault and could not be absorbed by the system. This control process prevents the reduction in the output of the synchronous generator $G_2$ and hence the acceleration thereof.

Figure 7:
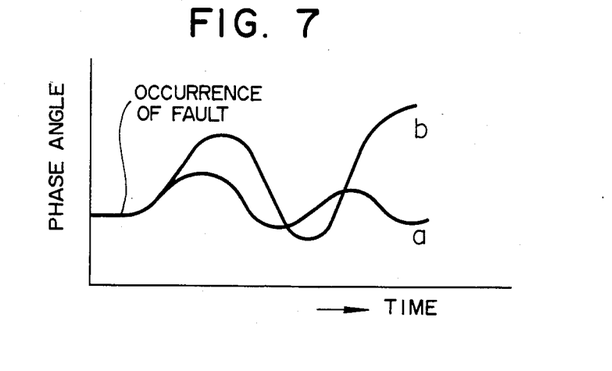
FIG. 7 is a graph showing improvement of stability of the system according to the present invention.

FIG. 7 is a diagram showing the comparison between the effect of this embodiment and that of the prior art. In FIG. 7, the curves represent changes in the phase angle of the synchronous machine $G_2$ at the time of the fault. The curve a relates to this embodiment, and the curve b to the prior art. As seen, the change in phase angle is reduced according to the present embodiment.

The correction of $\Delta\delta$ may be made according to any suitable one other than the equation (4), which is determined by taking according to account of the characteristics in stability of the system.

Figure 6:
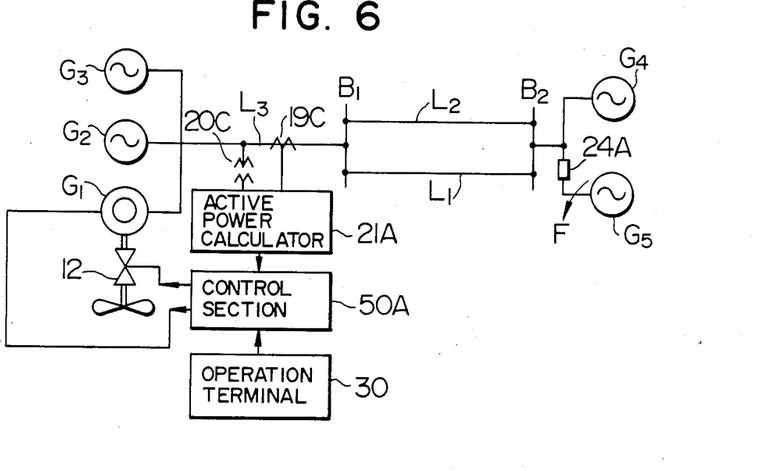
FIG. 6 is a diagram schematically showing another power system to which the present invention is applied.

FIG. 6 shows another power system to which the present invention is applied. The system $B_1$ is connected with two synchronous machines $G_2$, $G_3$, and one variable speed induction machine $G_1$, while the system $B_2$ is connected with two synchronous machines $G_4$, $G_5$. In this configuration, the power flow of the link system $L_3$ in proximity to the variable speed induction machine $G_1$ is used as control data for the variable speed induction machine $G_1$.

Now, assume that the power flow is directed from the system $B_1$ toward $B_2$, and that a fault has occurred at the point F. Upon interruption of the circuit breaker 24A, the synchronous machine $G_5$ is separated from the system thereby to reduce the power flow from $B_1$ to $B_2$. As a result, without control, the synchronous machines $G_2$, $G_3$ would accelerate and step out for the reasons similar to those mentioned with reference to FIG. 2. In order to prevent this step-out, the induction machine $G_1$ is controlled with secondary excitation through the control section 50. The control section 50 may use the same configuration as in FIG. 3.

Although the induction machine described in the foregoing embodiment is used as a generator normally in the pumped-storage power plant, the use of the induction machine is not limited to such an application. In short, according to the present invention, taking advantage of the fact that the AC motor/generator of secondary AC excitation type is free of step-out phenomenon, the unbalance power in a power system is absorbed by the AC motor/generator of the secondary AC excitation type thereby to improve the system stability. Specifically, the difference between the power demand at a control point and an output that can be covered by a synchronous machine is used as a power command value for the AC motor/generator of the type. By doing so, the amount of power that cannot be covered by the synchronous machine is borne by the AC motor/generator of the type, so that the synchronous machine is not required to bear more than a predetermined amount of power thereby to improve stability.

In the aforementioned embodiment, the primary active power of the induction machine is controlled in order to absorb the variation of active power of the power system. In order not to reduce the power factor of the power system, however, it is desired to control not only the active power, but also the reactive power. An example of a control system for controlling the speed and primary reactive power of an induction motor of secondary AC excitation type is disclosed in JP-A-No. 56-150987 laid open on Nov. 21, 1981. In this system, however, the control stability is not sufficiently high as the speed control and power factor control interfere with each other. Although this system is applicable to a comparatively small or medium size of induction motor, of which the power control does not affect stability of the power system, it is difficult to apply the control system with a satisfactory result to the control of the secondary excitation of an induction motor/generator for absorbing the active and reactive power variations in the power system as in the present invention.

According to a second embodiment of the invention, in a system like the one shown in FIG. 2, the active power and reactive power of the synchronous machine $G_2$ are detected by a power processor 21A, the active power command value and the reactive power command value for the induction machine $G_1$ are corrected in accordance with the variation of the active power, and both the active power-related component (component in the direction of induced voltage) and the reactive power-related component (in the direction of magnetic fluxes) of the secondary excitation current to be supplied to the induction generator $G_1$ in order to generate active and reactive power corresponding to the corrected active and reactive power commands, are determined independently of each other. These two components are combined in vector to produce a pattern of a secondary excitation current, and according to this pattern, the secondary excitation current is controlled. The second embodiment of the invention will be explained below with reference to FIGS. 8 to 12.

Figure 8:
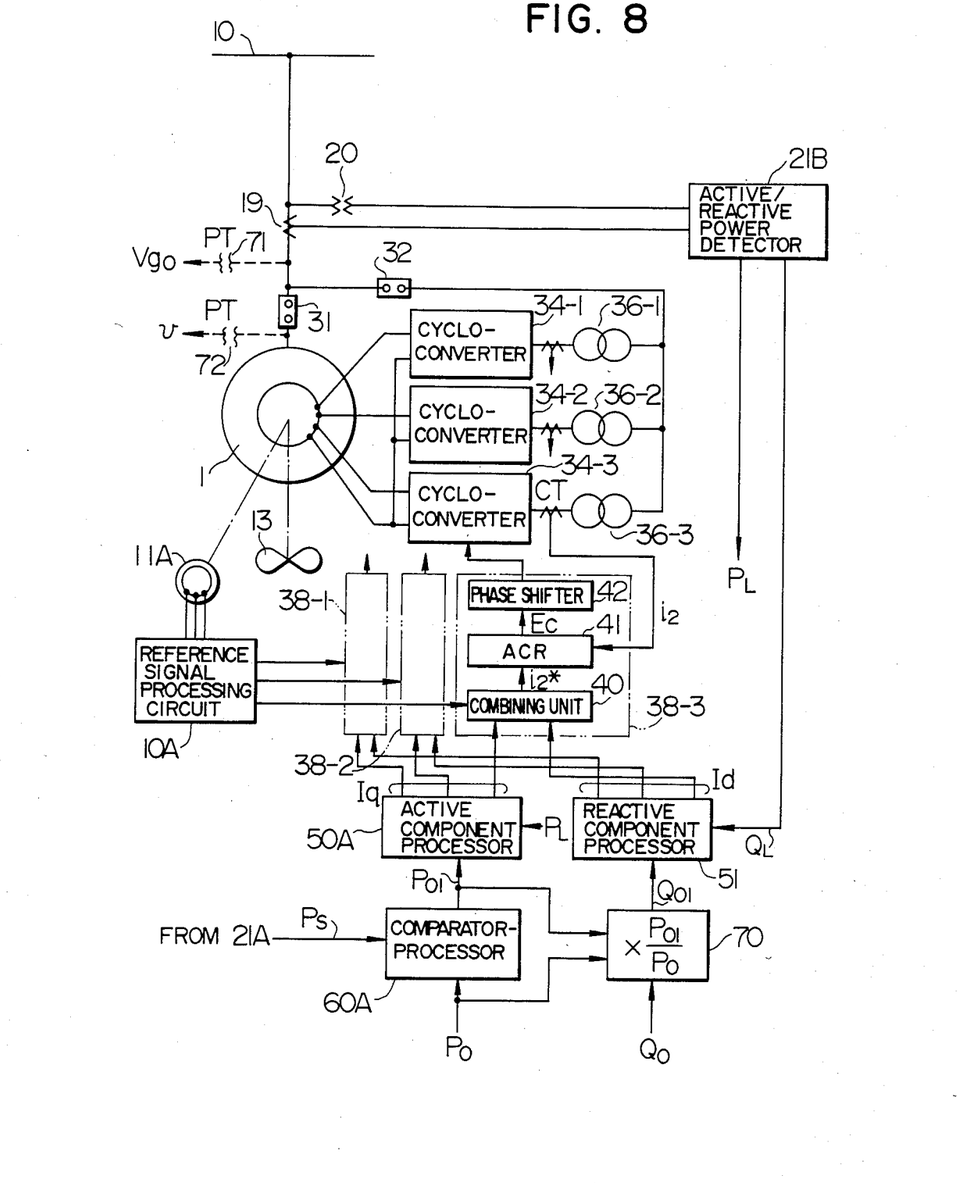
FIG. 8 is a block diagram of a control system according to another embodiment of the present invention.

In FIG. 8, component elements similar to those included in FIG. 3 are designated by the same reference numerals as in FIG. 3 respectively. Also, the parts related to the valve opening control of the water turbine 13, which is controlled in the same way as in FIG. 3, are omitted.

Figure 9:
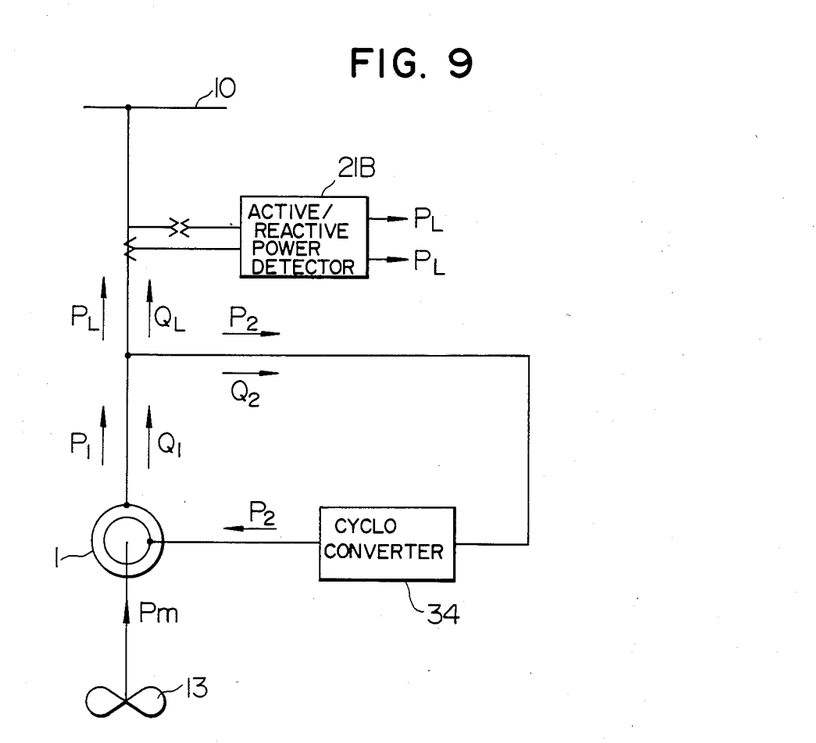
FIG. 9 shows a power flow in the power system to which the control system of FIG. 8 is applied.

The primary terminal of an induction generator 1 of wound-rotor type coupled to the water turbine 13 is connected through a circuit breaker 31 to a power system 10. The secondary winding of the generator 1 has four terminals including a neutral line and receives the three-phase exciting current from cyclo converters 34-1, 34-2, 34-3. The cyclo converters are connected to the primary side of the induction generator 1 through cyclo converter transformers 36-1, 36-2, 36-3 and a circuit breaker 32. The active power $P_L$ and the reactive power $Q_L$ produced from the induction generator 1 are detected by the active/reactive power detector 21B with the voltage transformer 20 and the current transformer 19 connected to the primary of the generator. The position detector 11A is a small induction machine having the same number of phases and poles as the generator 1 and coupled directly to the generator 1 for producing an output corresponding in amplitude and phase to the secondary induced voltage $E_0$ of the generator 1. A detection signal is applied to the reference signal processing circuit 10A, which produces based on the detection signal an active component reference signal $\cos \omega_s t$ having the same phase and slip frequency as the secondary induced voltage $E_0$ and a reactive component (component in the direction of magnetic fluxes) reference signal $\sin \omega_s t$ delayed by $\pi/2$ [rad] from the active component reference signal (for each of the three phases of both active and reactive components). Cyclo converter control units are provided one each for each phase and represented by 38-1, 38-2 and 38-3, respectively. FIG. 9 graphically illustrates the flow of active and reactive power obtained when the generator 1 is driven as a generator connected to the power system 10. The turbine output $P_T$ is applied to the induction generator 1, and the secondary power $P_2$ is supplied to the secondary winding from the cyclo converter 34, for generating the primary power $P_1$. Since the secondary power $P_2$ is supplied from the primary of the generator 1, the resultant active power $P_L$ supplied to the transmission line 10 is given as a difference between the active power $P_1$ generated in the primary of the generator and the secondary active power $P_2$ as shown below.

$$P_L = P_1 - P_2 \tag{5}$$

The resultant reactive power $Q_L$ flowing out to the system 10, like the active power $P_L$, is also given as a difference between the reactive component $Q_1$ generated in the generator 1 and a component $Q_2$ consumed by the cyclo converter as shown below.

$$Q_L = Q_1 - Q_2 \tag{6}$$

The power command given from the central load-dispatching station to the power station indicates an amount of the power demanded by the system, and a power value converter 21B is provided for detecting the resultant active power $P_L$ and the resultant reactive power $Q_L$ which are actually supplied to the system 10.

In the computation of the secondary excitation current command, the secondary excitation current is divided into two components, one in the direction of magnetic fluxes and the other in the direction of secondary induced voltage and having a phase difference of $\pi/2$ [rad] from the one component. Two components are computed independently of each other by the active and reactive component processors respectively, and the resulting computation values are combined in vector by a current controller thereby to produce a secondary excitation current pattern. On the basis of the secondary excitation pattern thus obtained, the cyclo converters are controlled so as to apply an excitation current corresponding to the excitation pattern to the secondary windings. Specifically, the secondary current component $I_q$ in the direction of the secondary induced voltage perpendicular to the direction of the magnetic fluxes $\Phi$ is effective to produce a torque in cooperation with the magnetic fluxes. The torque T is given as $$T = \Phi \cdot I_q \tag{7}$$

when the magnetic fluxes are constant, the torque T is proportional to $I_q$. Under an angular velocity of $\omega$, the relationship between the torque T and the active power $P_L$ is expressed as $$P_L = \omega T \tag{8}$$
$$= \omega \cdot \Phi \cdot I_q$$

It is thus possible to control the active power $P_L$ by controlling the current $I_q$. The reactive power $Q_L$, on the other hand, is controlled by controlling the current $I_d$ in the direction of the magnetic fluxes and having a phase difference of $\pi/2$ [rad] with respect to the component $I_q$ in the direction of the secondary induced voltage. If the active power is constant, the phase of the primary current is easily adjusted by changing the currend $I_d$ in the direction of the magnetic fluxes, thus making it possible to control the reactive power.

In this embodiment, the active and reactive power generated in the induction machine are also controlled to coincide with the command values $P_0$ and $Q_0$ respectively under normal state. In the case where there occurs variation of the active power load of the synchronous machines in parallel operation, the active power command $P_0$ is corrected int $P_{01}$ by the comparator-processor 60A in the same manner as in FIG. 3 according to the variation of the active power. The reactive power command $Q_0$, on the other hand, is corrected by the same ratio as the active power command. That is, the reactive power command $Q_0$ is multipled by $P_{01}/P_0$ at the multiplier 70 thereby obtaining a corrected reactive power command $Q_{01} = Q_0 \times P_{01}/P_0$.

Figure 10:
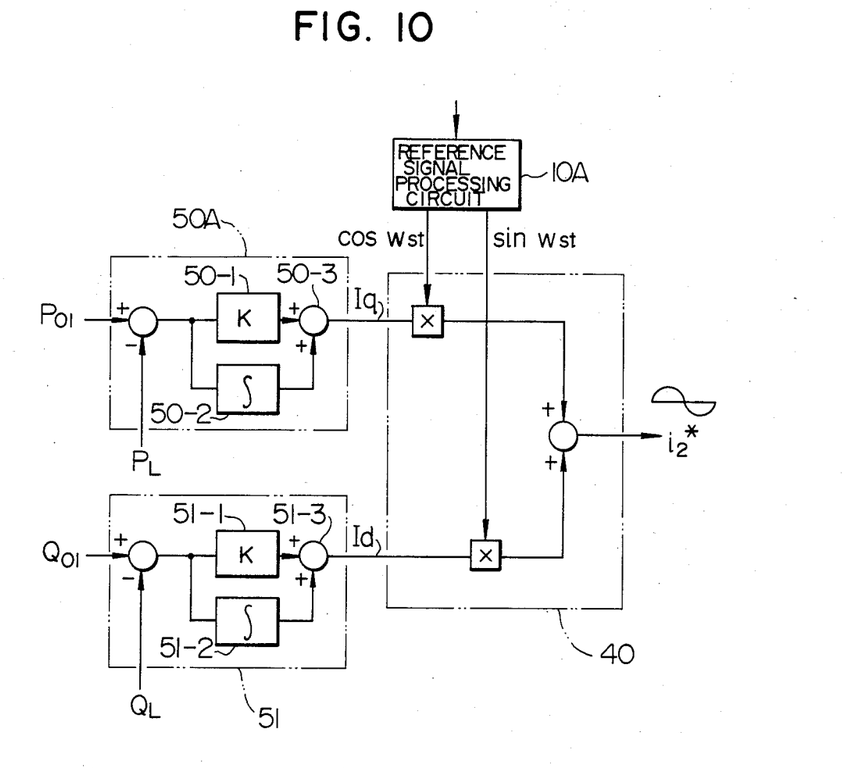
FIG. 10 is a block diagram showing the processor of the system of FIG. 8 in detail.

Returning to FIG. 8, the active component processor 50A determines the active component $I_q$ of the secondary current from the difference between the corrected active power command $P_{01}$ and the detected active power $P_L$. In similar fashion, the reactive component processor 51 determines the reactive component $I_d$ of the secondary current from the difference between the corrected reactive power command value $Q_{01}$ and the detected reactive power $Q_L$. The processors 50A, 51, as shown in FIG. 10, each includes a proportional processor 50-1 or 51-1 for obtaining a proportional component of a current difference corresponding to the active or reactive power difference, an integrating processor 50-2 or 51-2 for obtaining an integrating component of the current difference and an adder 50-3 or 51-3 for adding the integrating component to the proportional component, thereby obtaining the current component $I_q$ or $I_d$.

The current components $I_q$ and $I_d$ thus obtained are applied to the control unit 38 of the cyclo converter 34. The control device 38 includes control unit 38-1, 38-2, 38-3 of different phase but of the same construction. The control unit 38-3 will be explained as an example. The control unit includes a combining unit 40, a current control unit 41 and a phase shifter 42. The combining unit 40 is arranged as shown in FIG. 10 and operates so as to process the active component $I_q$ and the reactive component $I_d$ determined by the active component processor 50A and the reactive component processor 51 respectively by cos $\omega$st and sin $\omega$st produced from the reference signal processing circuit 10A thereby to obtain a pattern of secondary excitation current $i_2^*$ which is given by the equation shown below.

$$i_2^* = I_q \cdot \cos\omega_s t + I_d \cdot \sin\omega_s t \tag{9}$$
$$= I_2 \cos(\omega_s t + \delta)$$

$$\text{where } I_2 = I_d^2 + I_q^2 \tag{10}$$

$$\phi = -\tan^{-1}\frac{I_d}{I_q} \tag{11}$$

In vector expression, the secondary current $I_2$ is given as $$\dot{I}_2 = \dot{I}_q + \dot{I}_d$$

The primary equivalent of the secondary current $I_2$, as expressed with the single quotation mark "/", is given by $$\dot{I}_2' = \dot{I}_q' + \dot{I}_d' \tag{12}$$

Figure 11:
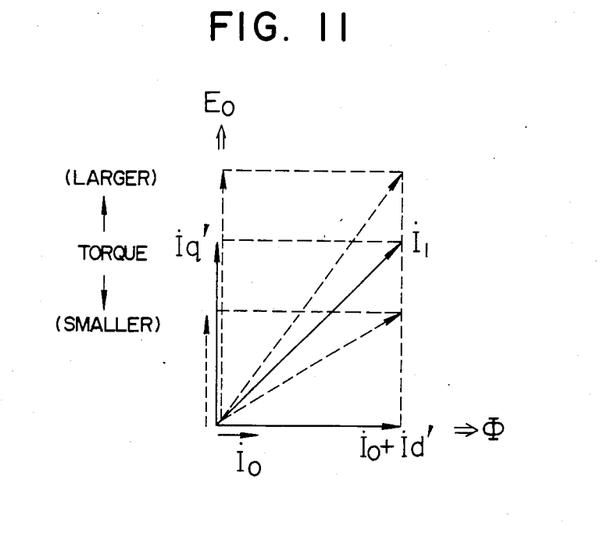
FIGS. 11 and 12 are diagrams for explaining the active and reactive power control respectively.
Figure 12:
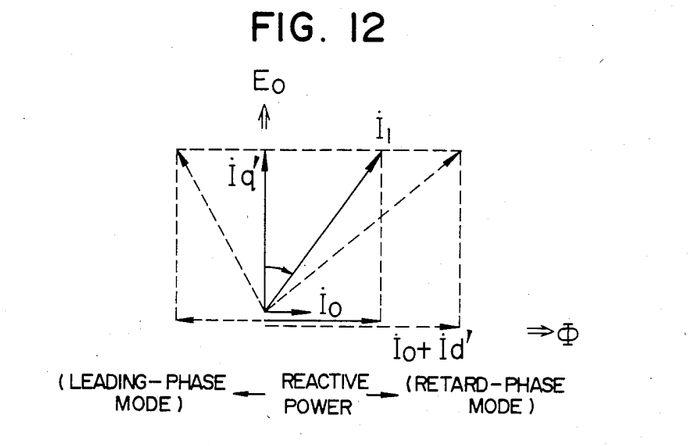

The current control unit 41 determines the ignition control angle $E_c$ of the cyclo converter on the basis of the difference between the secondary current $i_2^*$ determined in the manner mentioned above and the input current value $i_2$ of the cyclo converter detected by the current transformer CT, in a well-known manner as automatic current regulation (ACR). The phase shifter 42, on the other hand, controls the ignition of the cyclo converter by the ignition control angle $E_c$ determined in the current control unit 41. Referring to FIGS. 11 and 12, the control of the active and reactive powers will be explained. The active component is represented by a vector in the direction of the induced voltage $E_0$ (cos $\omega$st mentioned above) and the reactive component by a vector in the direction of the magnetic fluxes $\Phi$ (sin $\omega$st mentioned above). The reactive component $I_d'$ assumes the same phase as the excitation current. From this, the primary current $I_1$ is expressed by the equation (13) below.

$$\dot{I}_1 = \dot{I}_0 + \dot{I}_2' \tag{13}$$
$$= \dot{I}_q' + (\dot{I}_0 + \dot{I}_d')$$

FIG. 11 shows the manner in which the active power is controlled. If the vector component in the direction of the magnetic fluxes is fixed constant at $I_d = (I_0 + I_d')$, the torque, or the active power may be changed according to the equation (7) by changing the current $I_q'$ by the active power control. FIG. 12 shows the manner in which the reactive power is controlled. If the active component of the secondary current is constant, the induction machine may be operated selectively in the leading-phase mode or the retard-phase mode by controlling the reactive component $I_d(I_d')$ of the secondary current by the reactive power control.

Figure 13:
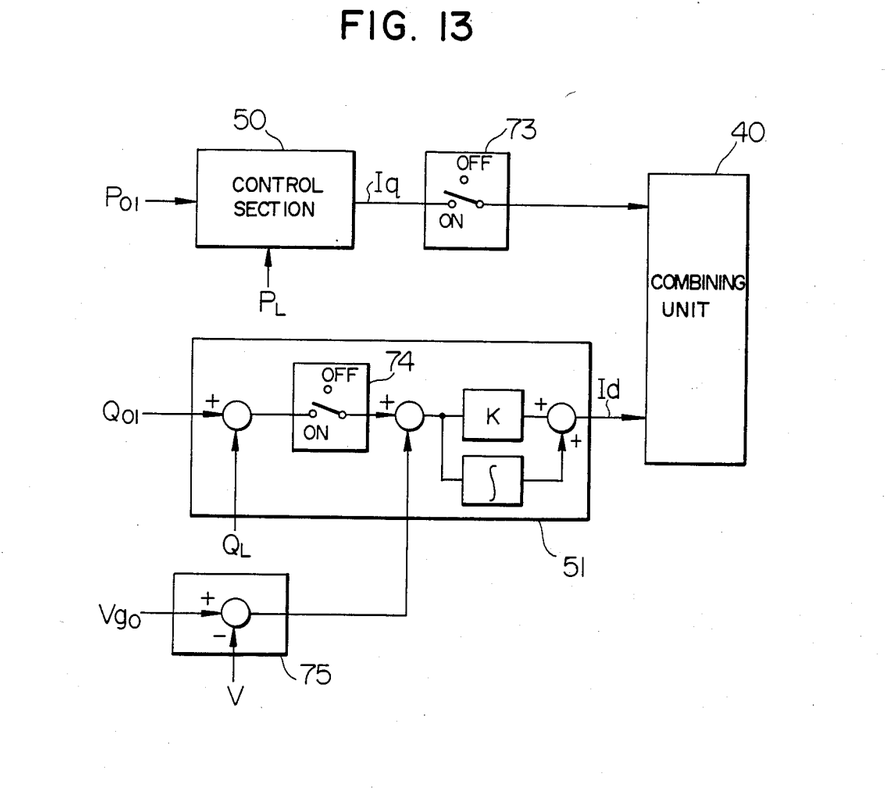
FIG. 13. is a diagram showing a modified part of the control system of FIG. 8.

In the aforementioned embodiment, even though a very satisfactory result is obtained in that the load of the induction generator is regulated to absorb an abrupt load variation in the power system under normal operating conditions, a certain problem is posed in parallel-insertion of the induction machine into the power system. In parallel-insertion, the induction machine is started and accelerated to the normal speed by the water turbine, followed by a voltage rise with excitation, while the circuit breaker 31 is off and the circuit breaker 32 is on. Under such a condition, however, there exists no power flow except for the power supplied from the cyclo-converters for the secondary excitation and hence the active power will be substantially zero and the reactive power will be substantially equal to the reactive component of the cyclo-converters. As a result, the voltage control function will be lost, thereby making a voltage rise impossible. In order to obviate this problem, power transformers 71, 72 are inserted for detecting the voltage $V_{go}$ of the power system and the primary voltage V of the induction machine 1 as shown by dotted lines in FIG. 8 on the one hand, and the active component processor 50 and the reactive component processor 51 are modified as shown in FIG. 13 on the other hand. In FIG. 13, change-over switches 73, 74 turn on and off when the circuit breaker 31 turns on and off respectively. A voltage regulating processor 75 is connected to the reactive component processor 51 in a manner as shown in FIG. 13. Before the parallel insertion of the induction machine into the power system, that is, under the condition that the circuit breaker 31 is off, the switch 73 is rendered off, and therefore, the active component $I_q$ applied to the combining unit 40 is zero. The reactive component processor 51, on the other hand, is supplied with $(V_{go}-V)$ from the voltage control processor 75 instead of the input $Q_{01}-Q_L$ for normal operation since the switch 74 is off. The combining unit 40, therefore, generates an excitation current pattern necessary for causing the primary voltage V of the induction machine to coincide with the voltage $V_{go}$ of the power system and thus functions as a normal automatic voltage regulator (AVR). Under this condition, the voltage phase of the generator 1 is $\pi/2$ [rad] with respect to the phase of the magnetic fluxes $\Phi$, since the secondary excitation current $I_2$ has substantially only a component in the direction of the magnetic fluxes $\Phi$. This phase is the same as that of the induced voltage $E_0$ at the position detector 11A. In other words, the voltage of the power system is in phase with the terminal voltage of the generator 1, thereby eliminating the need of the synchronizer which is required for parallel-insertion of the conventional synchronous generator.

Under the normal operating conditions with the circuit breaker 3 turned on, the voltage $V_{g0}$ of the power system and the terminal voltage V of the generator 1 have the relationship shown below.

$$V_{go}=V \qquad (14)$$

The output of the voltage control processor 75 thus becomes negligible.

We claim:

1. A control system for controlling the load of a variable-speed AC motor/generator having a primary winding connected to a power system to which at least one synchronous machine is also connected in parallel to said AC motor/generator, said AC motor/generator having a secondary AC excitation winding, said control system comprising:

excitation means connected between said power system and the secondary winding of said AC motor/generator for receiving an AC power from said power system and for producing an AC excitation current having a controlled phase angle which is supplied to the secondary excitation winding of said AC motor/generator for controlling at least an active power produced by said AC motor/generator according to the phase angel of said AC excitation current, phase angle control means for producing a phase angle signal based on an externally applied output command including at least an active power command indicating a desired active power to be produced by said AC motor/generator and for applying said phase angle signal to said excitation means so as to cause said excitation means to produce said AC excitation current having a phase angle determined by said phase angle signal, active power detecting means for detecting an AC active power transmitted between said power system and the at least one synchronous machine connected to said power system in parallel to said AC motor/generator, and correcting means for correcting said active power command according to a variation of the active power detected by said active power detecting means so that said phase angle signal is produced in accordance with the corrected active power command.

2. A control system according to claim 1, wherein when said detected active power variation exceeds a predetermined value, said correcting means corrects said active power command by an amount of said variation.

3. A control system for controlling the load of a variable-speed AC motor/generator having a primary winding connected to a power system to which at least one synchronous machine is also connected in parallel to said AC motor/generator, said AC motor/generator having a secondary AC excitation winding, said control system comprising:

active power detecting means for detecting an AC active power transmitted between said power system and the at least one synchronous machine connected to said power system in parallel to said AC motor/generator, correcting means receiving an externally applied output command including active and reactive power commands indicating desired and reactive powers, respectively, to be produced by said motor/generator, said correcting means being connected to said active power detecting means for correcting said active power command according to a variation of the active power detected by said active power detecting means and for correcting said reactive power command in a proportion to the correction of said active power command, excitation means connected between said power system and the secondary winding of said AC motor/generator for receiving an AC power from said power system and producing an AC excitation current which is supplied to the secondary winding of said AC motor/generator for controlling active and reactive powers in an output of said AC motor/generator, said excitation current having first and second components adapted to determined the active and reactive powers, respectively, in the output of said AC motor/generator, means for producing first and second signals in accordance with the corrected active and reactive power commands, respectively, said first and second signals being adapted to determine said first and second components of said AC excitation current, and means for combining said first and second signals and for applying the resultant signal to said excitation means so that said excitation means produces said AC excitation current having the first component determined by said first signal and the second component determined by said second signal, whereby said AC motor/generator generates an output including active and reactive powers corresponding to the corrected active and reactive power commands, respectively.

4. A control system according to claim 3, wherein when the variation of the detected active power exceeds a predetermined value, said correcting means corrects said active power command by an amount of said variation.

* * * * *